Fig. 1

No. 786,047. PATENTED MAR. 28, 1905.
R. F. McFEELY.
LASTING MACHINE.
APPLICATION FILED JULY 14, 1900.

WITNESSES:
M. M. Tuttle
A. M. Tuttle

INVENTOR:
R. F. McFeely
By Chs. Tuttle Atty

Fig. 16.

No. 786,047.                                                                          Patented March 28, 1905.

UNITED STATES PATENT OFFICE.

RONALD FRANCIS McFEELY, OF BEVERLY, MASSACHUSETTS, ASSIGNOR TO UNITED SHOE MACHINERY COMPANY, OF PATERSON, NEW JERSEY, A CORPORATION OF NEW JERSEY.

LASTING-MACHINE.

SPECIFICATION forming part of Letters Patent No. 786,047, dated March 28, 1905.

Application filed July 14, 1900. Serial No. 23,569.

*To all whom it may concern:*

Be it known that I, RONALD FRANCIS MC-FEELY, of Beverly, county of Essex, and Commonwealth of Massachusetts, have invented certain Improvements in Lasting-Machines, of which the following, read in connection with the accompanying drawings, is a specification.

This invention relates to machines for lasting boots and shoes, and particularly to lasting-machines of the type known as the "hand-method" lasting-machine, an example of which is shown and fully described in United States Letters Patent No. 584,744, of June 15, 1897. In machines of this type a single pair of pincers is employed which grip the upper and are actuated to work the upper over the last, and during certain portions of the lasting operation—for example, when the toe or other curved portions of the shoe are being operated upon—the pincers are given additional movements for forming plaits in the marginal edge of the upper to dispose of the excess of material.

The object of this invention is to provide improved mechanism for forming smooth and regular plaits in the edge of the upper.

Another object of the invention is to provide improved mechanism for imparting a yielding lateral movement to the pincers.

Other advantages of my invention will be hereinafter pointed out.

Referring to the drawings.

In the preferred embodiment of my invention herein shown the mechanism for forming plaits in the edge of the upper comprises pincers and mechanism for moving the pincers laterally and turning them, in combination with means for slitting the marginal edge of the upper.

The pincers, which comprise the members 14 and 18, are carried by bars 12 and 16, which are mounted in a carrier hereinafter described. The bar 12 gives support to bar 16 and is provided with a ball-shaped end 60, socketed in a lever 62, which is tilted vertically by suitable mechanism described and shown in said Patent No. 584,744 for lifting and lowering the pincers to carry out the operations of seizing the upper and straining it upwardly from the edge of the last. The said ball-and-socket connection allows the bar 12 to be swung forwardly and backwardly to effect movements of the pincers for laying the strained upper over the inner sole and also allows the bar 12 to be swung from side to side and turned to effect movements of the pincers for twisting and plaiting the upper during portions of the lasting operation. To facilitate the carrying out of said swinging and turning movements of the pincers without cramping the connecting mechanism, a carrier is employed, which comprises a vertical part 70, arranged in sliding engagement with the bar 12, said carrier also having a horizontal part 71, which is supported for rocking and endwise movements in the forked end of a yoke 72, carried by an endwise-movable shaft 74. The shaft 74 is actuated by mechanism described in the patent referred to, and the endwise movements of said shaft will operate to swing the bar 12, and consequently move the pincers backwardly and forwardly over the last for placing the gripped upper over the inner sole.

Figure 1:
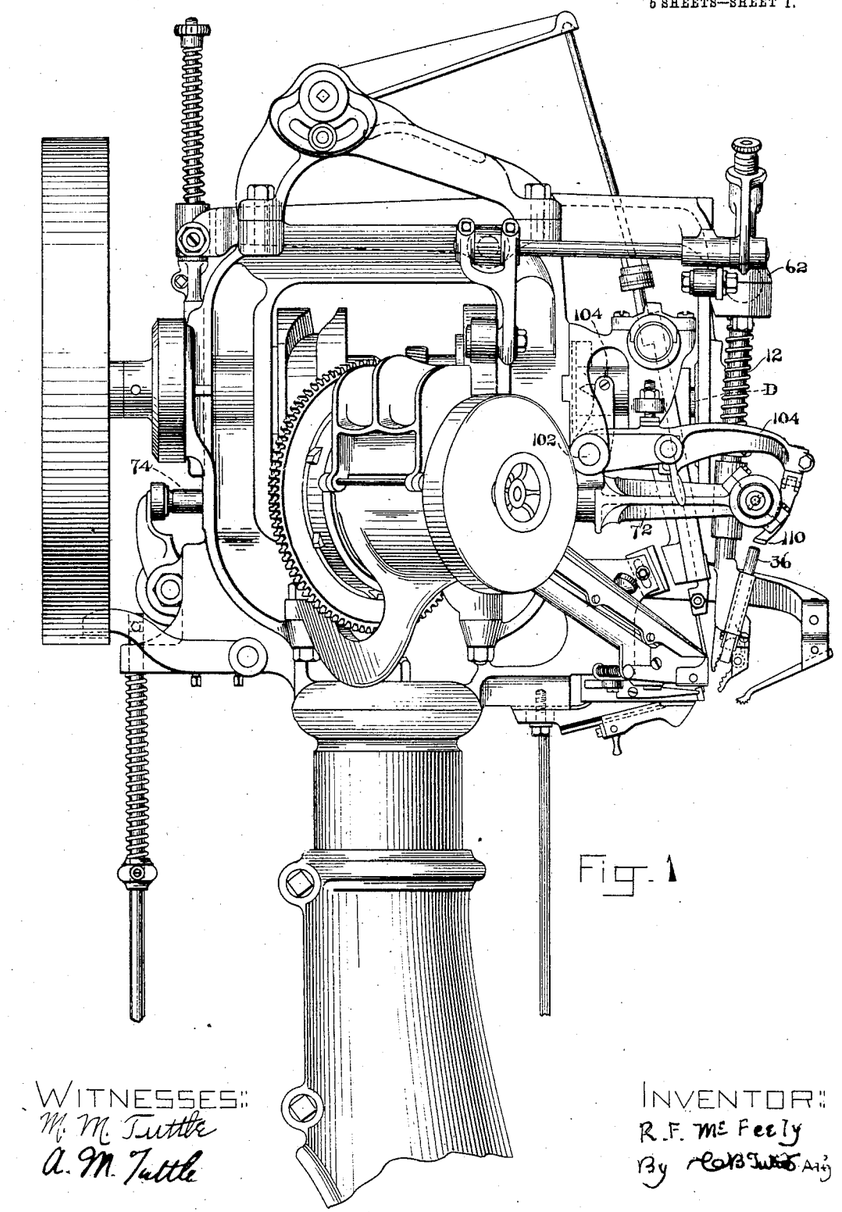
Figure 1 is a side elevation of a machine embodying this invention.
Figures 2, 3, 4:
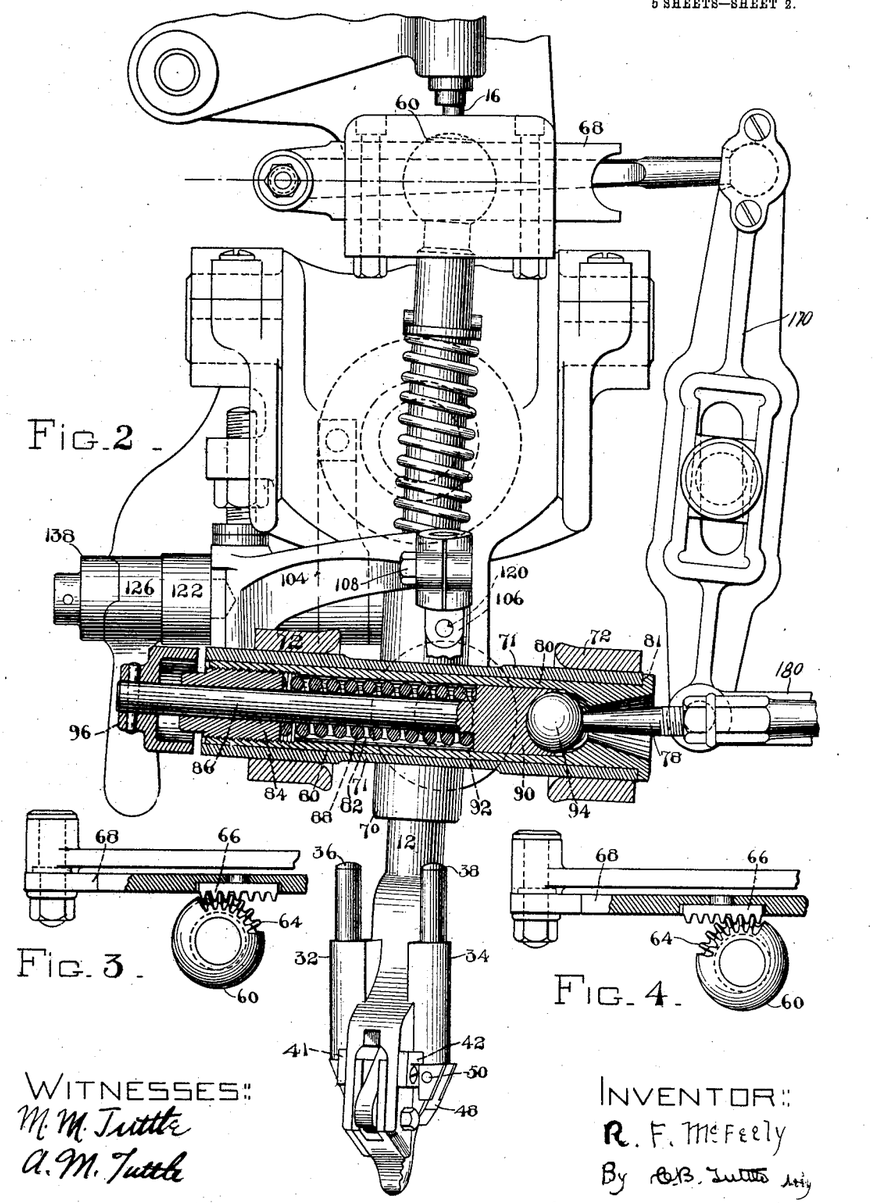
Fig. 2 is a front elevation, partly in section, of a portion of the machine shown in Fig. 1.
Figs. 3 and 4 are plan views showing details connected with Fig. 2.

The carrier which supports the pincer-bars is actuated for moving the pincers laterally by means of a rod 78, connected at one end to the carrier, as shown in Fig. 2, and at its other end to mechanism which imparts a reciprocating movement thereto, said mechanism being shown and described in the patent referred to. The mechanism which reciprocates rod 78 also imparts a reciprocating movement to a link 180, connected to the lower end of lever 170. To the upper end of said lever 170 is connected a slide-bar 68, having rack-teeth 66, which engage corresponding teeth 64, formed on the ball-shaped end 60 of the bar 12, so that whenever said slide-bar is moved the pincer-bar 12 will be rotated for turning or twisting the pincers about an axis which is approximately perpendicular to the bottom of the shoe being lasted, and as the rod 78 and link 180 are actuated by the same mechanism the pincers are turned and moved laterally simultaneously.

When the sides and other comparatively straight portions of a shoe are being lasted, the pincers operate in a plane substantially perpendicular to the central longitudinal plane of the machine, and at such times the mechanism for turning the pincers and moving them laterally is inoperative; but when the right-hand side of the toe portion is to be lasted the workman will actuate a shifting device, which causes said mechanism to become operative, so that at the next cycle of operations the pincers will be turned and moved laterally to the right of the central longitudinal plane of the machine into position to engage the edge of the upper at the right-hand side of the toe portion of the shoe, the gripping-faces of the pincers when they arrive at this position being in approximately the same plane as the edge of the upper which is to be gripped. After the upper has been gripped the pincers are turned and moved laterally to the left of said central longitudinal plane for forming a plait, as hereinafter described. When the left-hand side of the toe portion is to be lasted, the workman will change the position of the shifting device, and thereafter while said device is in this adjusted position the receiving position of the pincers will be at the left of said central longitudinal plane and their lateral movements for forming the plaits will be from left to right. In the machine herein shown as embodying my invention the shifting device is so connected to the mechanism for turning the pincers and moving them laterally that in case said shifting device is actuated at a certain time of the machine's operation said shifting device will cause the pincers to be turned and moved laterally. This, however, will not always occur, and in the following description and in the claims such expressions as "means for moving the pincers laterally and turning them" refer to the mechanism which the shifting device sets in operation.

The slits in the edge of the upper permit one section of upper to be superimposed upon the section adjacent thereto, so that each plait comprises only two thicknesses of upper material, and the turning movement of the pincers twists the section of upper which is to be superimposed relatively to the slit formed in the marginal edge of the upper. Preferably said section of upper is twisted about a center located at or near the inner end of the slit in the edge of the upper, so that the plait which is formed will extend from the inner end of the slit to the edge of the upper. Accordingly there is no tendency for the upper at the edge of the shoe to pucker or bunch up by reason of the plaits extending too far.

Figure 14:
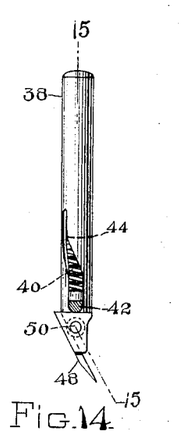
Fig. 14 is a detail view, partly in section, showing one of the cutters secured to its shaft.
Figure 15:
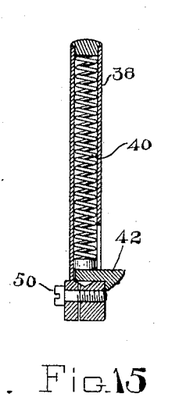
Fig. 15 is a section on line 15 of Fig. 14.
Figure 16:
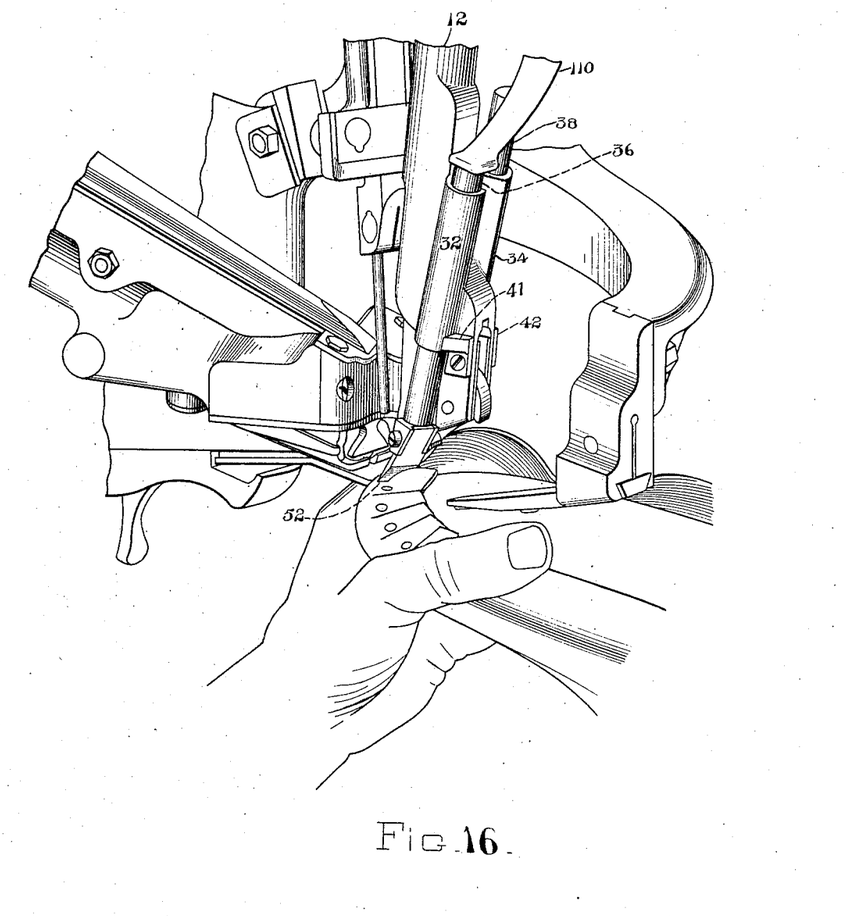
Fig. 16 is a perspective view illustrating the cutter in operation.

The cutters 52 and 48 are secured by clamping-screws 54 50 to tubular shafts 36 38, which are movably mounted in tubular boss extensions 32 34 on the pincers-bar 12. Said shafts are moved endwise in said extensions and during such movement are given a partial rotation by means of devices 41 and 42, attached to the bar 12 and projecting into spiral grooves or slots formed in the shafts, only one of said grooves being shown at 44 in Fig. 14. Springs 40, which are confined within the tubular shafts, rest upon the devices 41 42 and operate to hold said shafts normally elevated. The arrangement of said parts is such that the cutter 48 is on one side of the pincers, and on the other side thereof is the cutter 52, the purpose of mounting a cutter on each side of the pincers being to enable slits to be formed in the edge of the upper at one side of the pincers when they are turned and moved laterally in one direction for forming plaits on one side of the toe portion of the shoe and to enable slits to be formed in the edge of the upper at the other side of the pincers when they are turned and moved laterally in the opposite direction for forming plaits on the other side of the toe portion.

Figures 9, 11, 13:
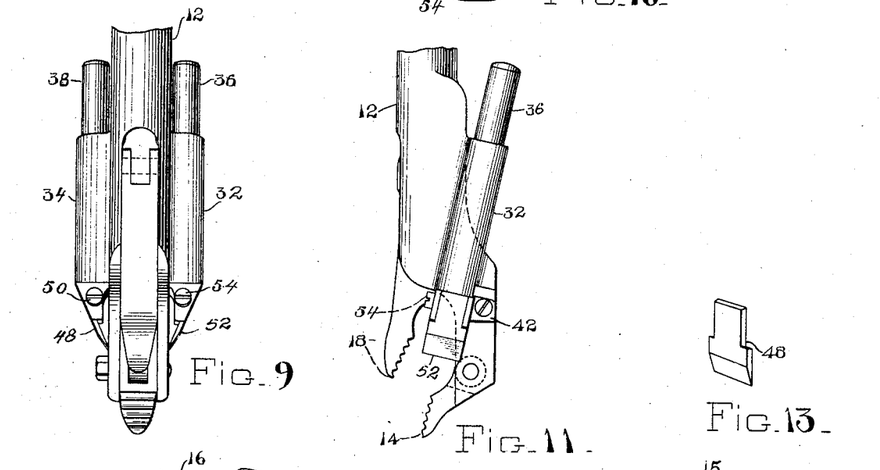
Fig. 9 is a detail view showing in front elevation the pincers and upper slitting members.
Fig. 11 is a side elevation of the parts shown in Fig. 9.
Fig. 13 is a perspective view of one of the cutters detached from its carrying-shaft.
Figure 10:
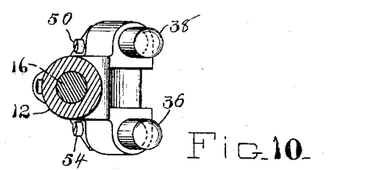
Fig. 10 is a plan of the parts shown in Fig. 9.
Figure 12:
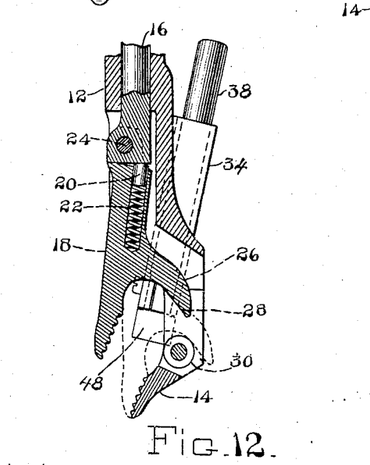
Fig. 12 is a longitudinal section of the parts shown in Fig. 9.

The cutters normally stand above the plane of the gripping-faces of the pincers, as shown in Figs. 9, 11, and 12, and after the pincers have gripped the upper and are moving upwardly to stretch the upper the shaft 36 or 38, depending upon which side of the toe or other curved part is being operated upon, is moved downwardly, thereby forcing the cutter into the edge of the upper material adjacent to the side of the pincers. In the downward movement of said cutter-shaft it is partially rotated by action of the device on the bar 12, which projects into the spiral groove or slot in the shaft, such partial rotation preferably taking place after the cutter has entered the edge of the upper and while it is approaching the end of its cutting movement. By rotating the cutter during the latter portion of its downward stroke I form the inner portion of the slit by a skiving cut which leaves the two edges beveled, so that the sections of upper may readily be overlapped in forming the inner or narrow end of the plait. Such movement of the cutter enables it to pass through the leather more easily and also causes it to bear upon the underneath section of upper at the inner end of the slit and smooth it down to receive the section which is superimposed thereon. The shaft and cutter are returned to normal position by the lifting-spring 40. Preferably the cutter is actuated for forming the slit at the same time the pincers are moving upwardly for stretching the upper, and as the upper is not stretched any after the slit has been formed all of the slits will terminate a uniform distance from the edge of the inner sole, thereby insuring uniform plaits.

In lasting the left side of the toe portion of the upper after the upper has been gripped and the cutter 52 has been actuated for forming a slit in the marginal edge thereof the pincers are moved laterally to the left of the central longitudinal plane of the machine to superimpose the slitted section of upper upon the section at the left thereof, said superimposed section being then fastened in place. The pincers are thereafter moved back into their receiving position at the right of said central plane, and the same operations are repeated for forming the other plaits at this side of the toe portion. These operations are reversed for the other side of the toe.

For operating the cutter-carrying shafts 36 and 38 a lever 104 is provided, said lever being loosely mounted on a rock-shaft 102, that is carried by the frame of the machine. (See Fig. 5.) A finger 110 is pivotally connected at 120 to a stud 106, which is fastened in the end of lever 104 by a bolt 108, said finger being held normally in alinement with the lever by a plunger 114, that is forced into engagement with a notch 112 in the end of finger 110 by a spring 116.

When the pincers are operating in their central position, the mechanism for turning the pincers and moving them laterally is inoperative, and the finger 110 passes between the cutter-carrying shafts 36 and 38 whenever lever 104 is depressed; but when said mechanism becomes operative the pincers are thereby turned and moved laterally into their receiving position, and the cutter-actuating mechanism then becomes operative, because one of said cutter-carrying shafts then stands in alinement with the finger 110, so that it will engage and depress it when the lever 104 is actuated.

Figures 5, 6, 7, 8:
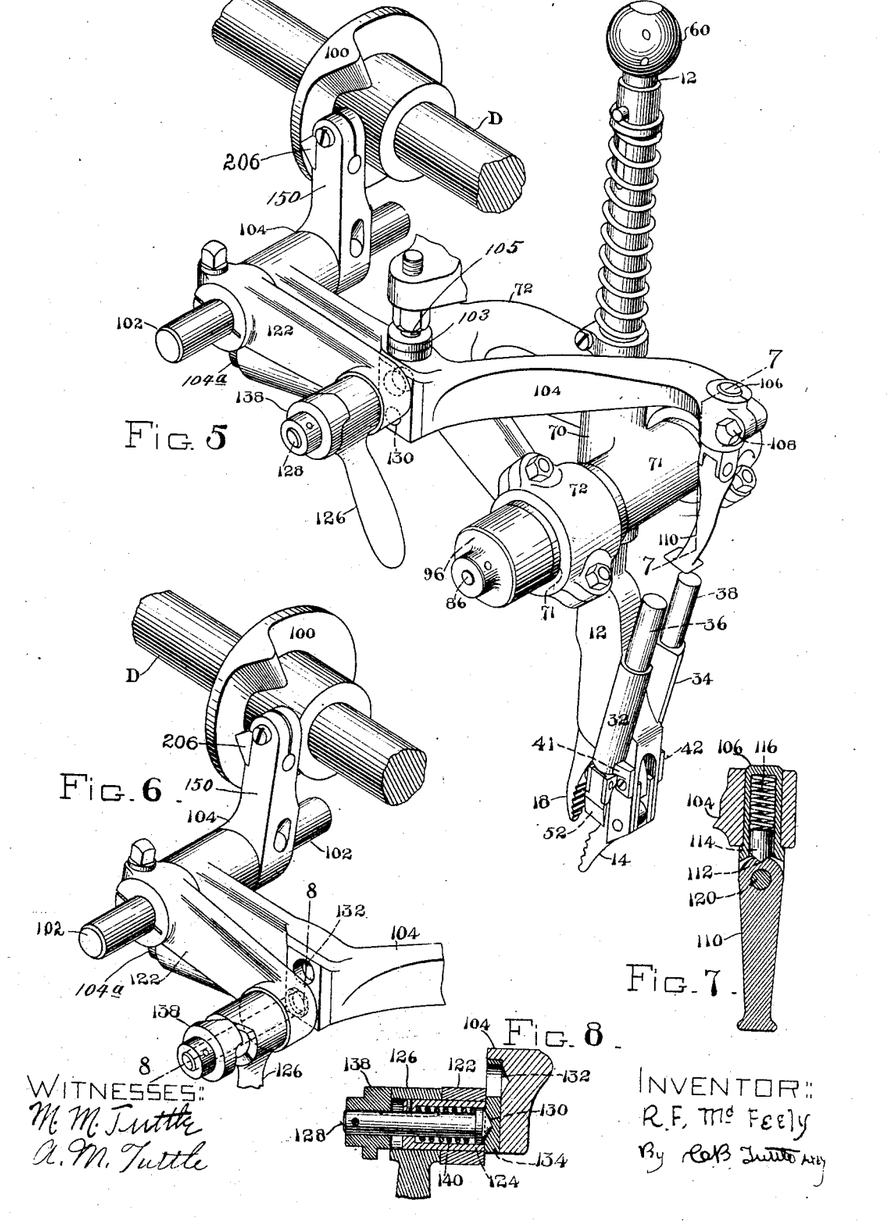
Figs. 5 and 6 are detail perspective views.
Fig. 7 is a section on line 7 of Fig. 5.
Fig. 8 is a section on line 8 of Fig. 6.

The lever 104 is provided with a buffer 103, which contacts with an adjustable stop 105, carried by the frame of the machine when the lever is in its elevated position, said lever being held normally elevated by a spring-pressed plunger 104ª, mounted in said lever and bearing against a stationary part of the frame, as shown in Fig. 5. The lever 104 is intermittingly depressed by means of a cam 100, mounted on the main shaft D, said cam coöperating with a wear-plate 206 on an arm 150, fixed to the rock-shaft 102. Another arm 122 is fastened to said rock-shaft and is provided with a movable plunger 128, which is adapted to engage recesses in a plate 134, carried by lever 104, so as to couple said arm and lever together, said lever being loosely mounted on the rock-shaft between the hubs of the arms 150 and 122. As the shaft 102 is rocked by means of the cam 100 the lever 104 through its connection with arm 122 will be moved downwardly. Sometimes it is desirable to discontinue the operation of the slitting mechanism while the pincers continue to turn and move laterally for forming plaits, and to provide for this the connection between the arm 122 and lever 104 is made adjustable, the plate 134 in lever 104 having two recesses 130 and 132 and the plunger 128 being movably mounted in the arm 122, so that it can be moved into engagement with either recess. Preferably said plunger 128 is mounted in a sleeve 124, carried by the arm, and is provided at its outer end with a cam-faced collar 138. A spring 140, mounted in said sleeve, moves the plunger outwardly so that it will engage one of the recesses in the plate 134, and a cam-faced lever 126, rotatably mounted on the sleeve 124, coöperates with the cam-face on collar 138 for retracting said plunger. As shown in Figs. 6 and 8, when the plunger is in engagement with recess 130 the wear-plate on arm 150 will be held out of the path of movement of the cam 100; but when the plunger is in engagement with recess 132, as shown in Fig. 5, said wear-plate will be in position to be engaged at each rotation of the cam and the shaft 102 will be intermittingly rocked and the lever 104 depressed.

It will be understood from the foregoing description that while the pincers are operating in their central position for lasting the straight portions of the shoe the cutter-actuating mechanism is inoperative, as the finger 110 passes between the cutter-carrying shafts and does not impart movement thereto; but when the operator moves the device which causes the pincers turning and moving mechanism to become operative and the pincers are thereby moved into either of their lateral positions the cutter-actuating mechanism will then become operative, as the finger 110 will then be in alinement with one of the cutter-carrying shafts, so that a downward movement of lever 104 will carry said finger into engagement with said shaft and cause the cutter to slit the edge of the upper. If the pincers should be moved laterally while the finger 110 is standing between the cutter-carrying shafts, said finger will swing on its pivot 120, thereby preventing breakage of parts.

In further carrying out my invention I have provided a novel yielding connection, herein shown as interposed between the pincers-carrier and the actuating-rod 78, for moving the pincers laterally. By means of this novel connection the movements of the pincers laterally in either direction may be effected yieldingly through a single spring. Referring to Fig. 2, the horizontal part 71 of the carrier has a central longitudinal chamber in which is slidingly mounted a plunger 80, having a shoulder 81 in juxtarelation with one end of part 71. Said part 80 has a longitudinal central opening or chamber 82, having threaded in its outer end a nut 84, provided with a bore for the rod 86, said rod passing loosely through said bore and being provided at its inner end with a head 90 in sliding engagement with plunger 80. In said chamber 82 is a spring 88, surrounding rod 86, the ends of said spring engaging the nut 84 and a shoulder 92 on the head of said rod. Fixed on the outermost end of rod 86 is a disk 96 in juxtarelation with the end of the horizontal part 71 of the carrier. A socket formed between the plunger 80 and the head 90 of rod 86 gives place for the ball end 94 of the actuating-rod 78. The relative arrangement of said mechanism is such that the disk 96 and shoulder 81 rest normally against the ends of the horizontal part 71 of the carrier. While in this position bar 12 is approximately perpendicular and may be moved for causing the pincers to grip, strain, and place the upper over the inner sole along the sides of the last and places where no plaiting of the upper or superimposing of the slitted parts thereof is desired, and consequently no turning or moving of the pincers laterally is needed.

It will be understood from the above description that moving the rod 78 endwise in one direction causes the shoulder 92 of rod 86 to move against the tension of spring 88, whereupon said spring yieldingly transmits the movement of said rod to nut 84, and consequently to the plunger 80 and horizontal part 71 of the carrier, for swinging the bar 12 with a yielding tension laterally to one side of the central longitudinal plane of the machine, as is required in order to move the pincers to plait or superimpose the slitted parts of the upper along one side of the shoe-toe. By moving the rod 78, and consequently the plunger 80, from their normal position endwise in the opposite direction the nut 84 is made to move against the tension of said spring 88, whereupon said spring yieldingly transmits the movement of said rod to rod 86 and to the disk 96 and horizontal part 71 for swinging the bar 12 with a yielding tension laterally to the other side, as is required for moving the pincers to plait or superimpose the slitted parts of the upper along the other side of the toe of the shoe. It is to be observed that a single spring 88 is employed, which insures a uniformly-yielding tension to the oppositely-directed lateral movements of the pincers. It will also be observed that the force required to swing the bar 12 to one side is exerted upon one end of the spring 88 and the force required to swing the bar 12 to the other side is exerted upon the other end of the spring 88. The tension of said spring may be varied by adjusting the nut 84. The construction embodying this feature of my invention is not only more satisfactory in operation than mechanisms heretofore used, but it is also much more economical, as it is simpler and comprises fewer parts.

The pincers herein shown comprise the member 14, rigidly connected to the bar 12, and the member 18, pivotally connected to the bar 16, which is supported by the bar 12. The pincers are opened by the uplifting endwise movement of bar 16 and are closed together by reversely moving said bar. This operation is effected by mechanism shown and described in the patent referred to.

In the member 18 is a plunger 20, having one end on the bar 16 and its other end on a spring 22, so that during the opening of the pincer members 14 18 the plunger will be actuated for swinging the member 18 outwardly on pivot 24. Said member 18 has a projection 26, provided with a cam-face 28 for engaging a roll 30 on bar 14, so that during the closing-together movement of the pincer members the member 18 will be swung inwardly to the proper alinement for closing onto the member 14, as indicated in dotted lines in Fig. 12. This swinging action of the member 18 insures movement thereof outwardly to a desirable position beyond the edge of the shoe-upper material placed against the member 14 and then causes said member 18 to move to the gripping position without crushing the gripped material.

Having fully described my invention, what I claim as new, and desire to secure by Letters Patent of the United States, is—

1. A machine for working an upper over a last, comprising a cutting device and means to actuate said device to cut the upper with a twisting cut.

2. A machine for working an upper over a last, comprising a cutting device and means to actuate said device to cut the upper during a portion of its operation with a square cut and during a portion of its operation with a skiving cut.

3. A machine for working an upper over a last, comprising a cutting device and means to actuate said device to cut the upper at first with a square cut and then with a skiving cut.

4. A machine for working an upper over a last, comprising pincers, means for actuating said pincers to grip the upper, a cutter, means to actuate it for cutting the upper while it is gripped, and means to turn the cutter during the cutting operation.

5. A machine for working an upper over a last, comprising a cutter, actuating mechanism to advance the cutter for slitting the upper, and means to turn the cutter, said means operating to begin the turning of said cutter after the slitting operation is begun.

6. A machine for working an upper over a last, comprising a cutter, means to advance the cutter for slitting the upper, and means coöperating with the cutter for turning it during its advancing movement.

7. A machine for working an upper over a last, comprising pincers, means for actuating said pincers to grip the upper, a cutter, means to advance the cutter for slitting the upper, and means carried by the pincers and coöperating with the cutter for turning it during the cutting operation.

8. In a lasting-machine, means for working an upper over a last, a cutting device, mechanism for actuating the cutting device to slit the upper, and means adapted to become operative during the action of the cutting device for changing its path of movement.

9. In combination with the pincers, the shaft 38 arranged for movement endwise and axially and provided with a spiral slot, the cutter 48 carried by said shaft, a part 42 on the pincers and extending through the spiral slot in said shaft, and mechanism for moving said shaft endwise in opposite directions.

10. In combination with the pincers, the shaft 38 arranged for movement endwise and axially and provided with a spiral slot, the cutter 48 mounted in said shaft, the part 42 mounted on said pincers and projecting through the spiral slot in said shaft, a cam-actuated lever for moving said shaft endwise in one direction, and a spring for reversely moving the shaft.

11. A machine for working an upper over a last, comprising pincers, supporting means therefor, mechanism for closing said pincers to grip the upper and for turning the pincers, a cutting device also carried by said supporting means, and means for actuating the cutting device to slit the upper.

12. A machine for working an upper over a last, comprising pincers, means for actuating the pincers to grip the upper, a cutting device, means for actuating the cutting device to slit the upper, and means for turning the pincers.

13. In a machine for working an upper over a last, pincers for gripping the upper, a cutting device, means for actuating the cutting device to slit the upper, and mechanism for actuating the pincers to grip and stretch the upper and twist it with relation to the slit formed by the cutting device.

14. A machine for working an upper over a last, comprising pincers adapted for gripping the upper, means to move the pincers laterally, means to turn the pincers, a cutter, and means to actuate the cutter for slitting the upper.

15. In a machine for working an upper over a last, pincers for gripping the upper, a cutter, means for operating the cutter to cut a slit in the upper, mechanism for actuating the pincers to grip a section of upper and superimpose it upon an adjacent section, and means for turning the pincers to twist the gripped section of upper about a center located substantially at the inner end of the slit formed in the upper.

16. A machine for working an upper over a last, comprising pincers, means to actuate the pincers to grip the upper, means for relatively moving the last and pincers for stretching the upper, a cutting device, means for actuating the cutting device to slit the upper, and means for turning the pincers about an axis approximately perpendicular to the bottom of the shoe.

17. A machine for working an upper over a last, comprising pincers adapted for gripping the upper, a cutting device, means to turn the pincers, and means to actuate the cutting device for slitting the upper, said cutter-actuating means being constructed and arranged to be operative when the pincers-turning means is operative.

18. A machine for working an upper over a last, comprising pincers adapted for gripping the upper, means for simultaneously moving the pincers laterally and turning them, a cutter for slitting the edge of the upper, and cutter-actuating means constructed and arranged to be operative when the means for moving the pincers laterally and turning them is operative.

19. A machine for working an upper over a last, comprising pincers adapted for gripping the upper, a cutting device, means to turn the pincers and means to actuate the cutting device for slitting the upper, the cutter-actuating means being constructed and arranged to be operative when the pincers-turning means is operative and to be inoperative when the pincers-turning means is not operative.

20. In a machine for working an upper over a last, the combination with pincers that are adapted to be moved laterally from a central position and turned into an angular position, of a cutter mounted thereon, and means for actuating said cutter when the pincers are in their angular position, the cutter being inoperative when the pincers are in their central position.

21. In a machine for working an upper over a last, the combination with turning and laterally-moving pincers, an upper-slitting device movable with said pincers, means located out of alinement with the normal position of the slitting device for actuating said device, and means for moving the pincers laterally and thereby establishing operative relationship between the upper-slitting device and the part by which it is actuated.

22. A machine for working an upper over a last, comprising pincers for gripping and stretching the upper, a cutting device, means to actuate said device for slitting the upper, actuating mechanism for closing and lifting said grippers, and mechanism adapted to be rendered operative at the will of the workman for putting the cutting device into operative relation to its actuating mechanism and for turning and moving the pincers laterally to plait the upper.

23. A machine for working an upper over a last, comprising pincers, a cutting device, means to actuate the cutting device for slitting the upper, and means to turn the pincers and move them laterally in one direction to grip the upper and thereafter turn the pincers and move them laterally in the opposite direction for plaiting the upper.

24. A machine for working an upper over a last, comprising pincers, means for turning the pincers and moving them laterally into position to grip the upper and thereafter turning and moving them laterally in the opposite direction for plaiting the upper, a cutting device movable with the pincers, and means for actuating said device while the pincers are in position for gripping the upper.

25. A machine for working an upper over a last, comprising pincers, means for moving the pincers laterally and turning them to set them in position for gripping the upper, a cutting device, means for closing the pincers, and means to actuate the cutting device after the pincers have gripped the upper.

26. A machine for working an upper over a last, comprising pincers adapted for gripping the upper, a cutting device, means to set the pincers in position to grip the upper, means to actuate said cutting device for slitting the upper, and means for simultaneously moving the pincers laterally and turning them with relation to the slit formed by the cutting device.

27. A machine for working an upper over a last, comprising pincers adapted for gripping the upper, a cutting device, means to set the pincers and cutting device in position to grip and slit the upper, means to actuate the cutting device for slitting the upper, and means for simultaneously moving the pincers laterally and turning them with relation to the slit formed by the cutting device.

28. In a machine of the class described, pincers, a carrier, a spring, and means to actuate said carrier, said means acting upon one end of said spring to move the carrier in one direction and upon the other end of said spring to move the carrier in the opposite direction.

29. In a machine of the character indicated, in combination, the pincers, and a carrier connected therewith, a spring, a positive connection between said carrier and one end of said spring, also a positive connection between said carrier and the other end of said spring, and means to move said connections whereby the pincers are yieldingly carried at one time in one direction and at another time in the opposite direction.

30. In a machine of the class described, pincers, a carrier connected therewith, a spring supported by said carrier, and means acting through the length of said spring to move the carrier at one time in one direction and at another time in the opposite direction.

31. In a machine of the class described, pincers, a carrier connected therewith, a telescoped connection in said carrier, a spring between said connection and the carrier, and means to actuate said connection whereby the pincers are yieldingly carried at one time in one direction and at another time in the opposite direction.

Signed by me at Lynn, Massachusetts, this 5th day of June, 1900.

RONALD FRANCIS McFEELY.

Witnesses:
A. M. TUTTLE,
C. B. TUTTLE.